Sept. 29, 1925.
D. VAN DE GENACHTE
SNOW REMOVER
Filed March 21, 1925
1,555,777
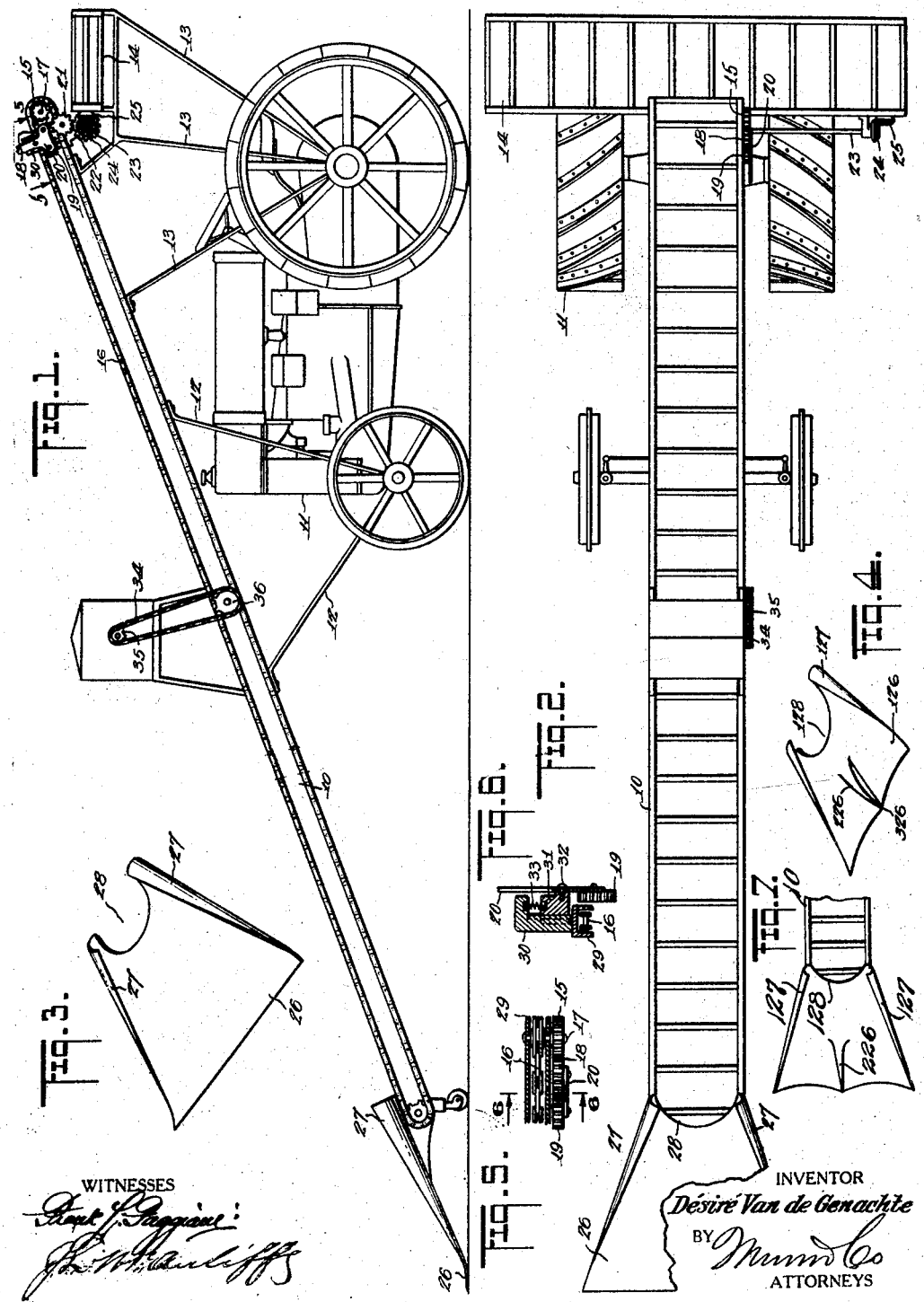
INVENTOR
Désiré Van de Genachte
BY
ATTORNEYS Patented Sept. 29, 1925.

1,555,777

UNITED STATES PATENT OFFICE.

DÉSIRÉ VAN DE GENACHTE, OF NEW YORK, N. Y.

SNOW REMOVER.

Application filed March 21, 1925. Serial No. 17,284.

*To all whom it may concern:*

Be it known that I, DÉSIRÉ VAN DE GENACHTE, a citizen of Belgium, and a resident of the city of New York, borough of Manhattan, in the county and State of New York, have invented a new and Improved Snow Remover, of which the following is a full, clear, and exact description.

My invention relates to a snow remover, and particularly to a snow remover employing endless conveyor means with means to gather the snow and direct it to the conveying means, said conveying means being mounted on a tractor or like wheeled structure so as to be drawn over the ground.

The general object of my invention is to provide a snow remover as indicated improved in various particulars, especially with respect to the means to gather and direct the snow to the conveyor means and with respect to the means for operating the conveyors so that the snow will be directed toward a wagon when drawn alongside the snow remover.

The nature of my invention and its distinguishing features and advantages will clearly appear as the description proceeds.

Reference is to be had to the accompanying drawings forming part of this specification, it being understood that the drawings are merely illustrative of one example of the invention.

Figure 1 is a side elevation of a snow remover embodying my invention.

Figure 2 is a plan view thereof, the chain being omitted in the interest of claims.

Figure 3 is a perspective view of the scraper and gathering device.

Figure 4 is a perspective view of the scraper and gatherer in another form.

Figure 5 is a detail sectional view on a slightly enlarged scale, the section being indicated by the line 5—5 in Figure 1.

Figure 6 is a transverse vertical section on the line 6—6 of Figure 5.

Figure 7 is a plan view of the forward portion of the snow remover, showing the preferred form of scraper attached to the forward end of the elevating conveyer.

In carrying out my invention in practice in accordance with the illustrated example, an endless elevating conveyor 10 is provided supported on propelling means, there being shown a tractor 11 of known form, the supporting means consisting of brackets 12 at the front of the tractor and brackets 13 at the rear of the tractor. On the brackets 13 is supported a transverse endless conveyor belt 14 disposed below the upper end of the conveyor 10.

In order to operate the conveyors 10 and 14, a sprocket chain 16 extends along the conveyor 10 at a side thereof in the illustrated example as one means for the purpose. Said chain 16 is engaged by a sprocket pinion 36 driven by a chain 34 from a sprocket 35 actuated in any suitable manner. The chain 16 at its upper end turns a sprocket drive pinion 15 on a stud shaft 17. A lever 20 is fulcrumed as at 32 and carries a sprocket pinion 18 and a sprocket pinion 19 in mesh with each other. A transverse shaft 23 carries a sprocket gear 22 which is in mesh with a sprocket pinion 21. The lever 20 may be rocked to cause the pinion 18 thereon to mesh with both the pinion 15 and the pinion 21 to thereby drive the sprocket pinion 22 and shaft 23 in the one direction. The lever 20 when rocked in the opposite direction is adapted to cause the pinion 18 to be disengaged from the pinion 21 and cause the pinion 19 to engage said pinion 21, so that the turning of pinion 15 will, through pinions 18 and 19, turn the pinion 21 and thereby turn the sprocket pinion 22 and shaft 23 in the opposite direction. On shaft 23 is a bevel pinion 24 which meshes with the pinion 25 on the shaft operating the transverse conveyor 14. Thus, by throwing the lever 20, the conveyor 14 may be driven in either direction for dumping material into a wagon drawn alongside the snow remover at either end of the conveyor 14. The lever 20 has its fulcrum 32 on a block 31 which is adapted to slide vertically on an upright bracket 30 on the frame 29 of the elevating conveyor 10. The block 31 is yieldingly pressed by spring 33.

At the lower end of the inclined elevating conveyor 10, I provide a snow scraper and gatherer 26 which narrows toward the rear end and has its side edges 27 turned over so that the snow advancing rearwardly along the scraper 26 will be rolled over toward the center of the scraper. Said scraper at its rear end is formed with a cutout at 28, and said rear end is disposed directly above the lower end of the conveyor 10; thus snow moving rearwardly along the scraper 26 will be rolled over by the side edges 27 and dropped through the cut-out 28 onto the conveyor 10.

In Figure 4, the scraper 126 has rolled side edges 127 at the rear end, as well as a cut-out 128 corresponding with the similar features in Figure 26. At the front end, the scraper 126 at the medial line has a rib 226 and a forwardly extending cutting point 326 with the idea of cutting hard snow or ice.

I would state in conclusion that while the illustrated example constitutes a practical embodiment of my invention, I do not limit myself strictly to the details herein illustrated, since, manifestly, the same can be considerably varied without departure from the spirit of the invention as defined in the appended claims.

Having thus described my invention, I claim:

1. In a snow remover, inclined snow elevating conveying means, and a scraper at the lower end of said conveying means, said scraper having rolled over side edges near the rear end and a cut-out in the rear end permitting the scraped snow to drop through the cut-out onto the said conveying means, said cut-out forming an opening extending forwardly from the general plane of the rear edge of the scraper.

2. In a snow remover, inclined snow elevating conveying means, and a scraper at the lower end of said conveying means, said scraper having rolled over side edges near the rear end and a cut-out in the rear end permitting the scraped snow to drop through the cut-out onto the said conveying means, said scraper furthermore having a rib at the medial line at the front end of the scraper and having the front edge presenting a cutting point.

3. In a snow remover, a conveying means for the snow, and a scraper at the lower end of said conveying means, said scraper having rolled-over side edges adjacent the rear end and giving the scraper a convergent form at the rear portion, the scraper furthermore having a cut-out in the rear presenting an opening extending forwardly and permitting the scraped snow to drop through the cut-out onto said conveying means.

DÉSIRÉ VAN DE GENACHTE.